United States Patent
Okamoto (10) Patent No.: US 8,004,567 B2
(45) Date of Patent: Aug. 23, 2011

(54) PORTABLE DEVICE CAPABLE OF CONNECTING TO AND SELECTING AN EXTERNAL DEVICE

(75) Inventor: Teppei Okamoto, Saitama (JP)

(73) Assignee: Hoya Corporation, Tokyo (JP)

( * ) Notice: Subject to any disclaimer, the term of this patent is extended or adjusted under 35 U.S.C. 154(b) by 396 days.

(21) Appl. No.: 12/186,032

(22) Filed: Aug. 5, 2008

(65) Prior Publication Data

US 2009/0046159 A1 Feb. 19, 2009

(30) Foreign Application Priority Data

Aug. 15, 2007 (JP) ................................ 2007-211940

(51) Int. Cl.
H04N 5/225 (2006.01)
G06F 3/12 (2006.01)

(52) U.S. Cl. ................ 348/207.2; 348/207.99; 358/1.15

(58) Field of Classification Search ............... 348/207.2, 348/207.99; 358/1.15
See application file for complete search history.

(56) References Cited

U.S. PATENT DOCUMENTS

| | | | |
|---|---|---|---|
| 7,113,218 B2 * | 5/2006 | Battles et al. | 348/333.01 |
| 7,170,557 B2 * | 1/2007 | Manico et al. | 348/333.07 |
| 7,330,215 B2 * | 2/2008 | Ito | 348/375 |
| 7,359,080 B2 * | 4/2008 | Takemura | 358/1.15 |
| 7,542,070 B2 * | 6/2009 | Kinjo | 348/116 |
| 2002/0149695 A1 * | 10/2002 | Kayanuma | 348/375 |
| 2004/0212822 A1 * | 10/2004 | Schinner | 358/1.15 |
| 2005/0146610 A1 | 7/2005 | Creamer et al. | |
| 2005/0149979 A1 | 7/2005 | Creamer et al. | |
| 2006/0009260 A1 * | 1/2006 | Takemura | 455/556.1 |
| 2006/0031902 A1 | 2/2006 | Creamer et al. | |
| 2006/0132609 A1 * | 6/2006 | Nogo et al. | 348/207.2 |
| 2007/0013781 A1 * | 1/2007 | Kageyama et al. | 348/207.2 |
| 2007/0268373 A1 | 11/2007 | Creamer et al. | |
| 2007/0288974 A1 | 12/2007 | Creamer et al. | |

FOREIGN PATENT DOCUMENTS

JP 2004-221936 8/2004

OTHER PUBLICATIONS

English language Abstract of JP 2004-221936, Aug. 5, 2004.

* cited by examiner

Primary Examiner — Lin Ye
Assistant Examiner — Marly Camargo
(74) Attorney, Agent, or Firm — Greenblum & Bernstein, P.L.C.

(57) ABSTRACT

A portable device that sends and receives data to and from one of a plurality of external devices is provided. The portable device has connecting members, a selecting member, and a communicating member. The connecting members send and receive data to and from said external devices. The selecting member selects one of said connecting members among those connected to some of said external devices. The communicating member sends and receives data to and from an external device using the selected connecting member.

9 Claims, 8 Drawing Sheets

PORTABLE DEVICE CAPABLE OF CONNECTING TO AND SELECTING AN EXTERNAL DEVICE

BACKGROUND OF THE INVENTION

1. Field of the Invention

The present invention relates to a portable device, and more particularly, to an operating device which is connected to an external device, and send and receive data to and from the external device.

2. Description of the Related Art

A portable device may be connected to an external device in order to send and receive data to and from the external device. For example, a digital camera may be connected to a printer, and send image data stored in the digital camera to the printer. The digital camera detects whether a printer is connected to the digital camera before sending image data. This construction is disclosed in Japanese Unexamined Patent Publication (KOKAI) No. 2004-221936.

However, some digital cameras have a number of connecting members. When such digital cameras are simultaneously connected to a number of external devices through connecting members, the digital camera may become "confused" as to whether it is sending or receiving data, and transferred data may be lost.

SUMMARY OF THE INVENTION

An object of the present invention is to provide a portable device which has a plurality of connecting members, and sends and receives data reliably even when a plurality of external devices are connected to the portable device at the same time.

The present invention is a portable device that sends and receives data to and from one of a plurality of external devices is provided having connecting members, a selecting member, and a communicating member. The connecting members send and receive data to and from said external devices. The selecting member selects one of said connecting members among those connected to external devices. The communicating member sends and receives data to and from an external device using the selected connecting member.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention is described below with reference to the embodiments shown in the drawings.

Figure 1:
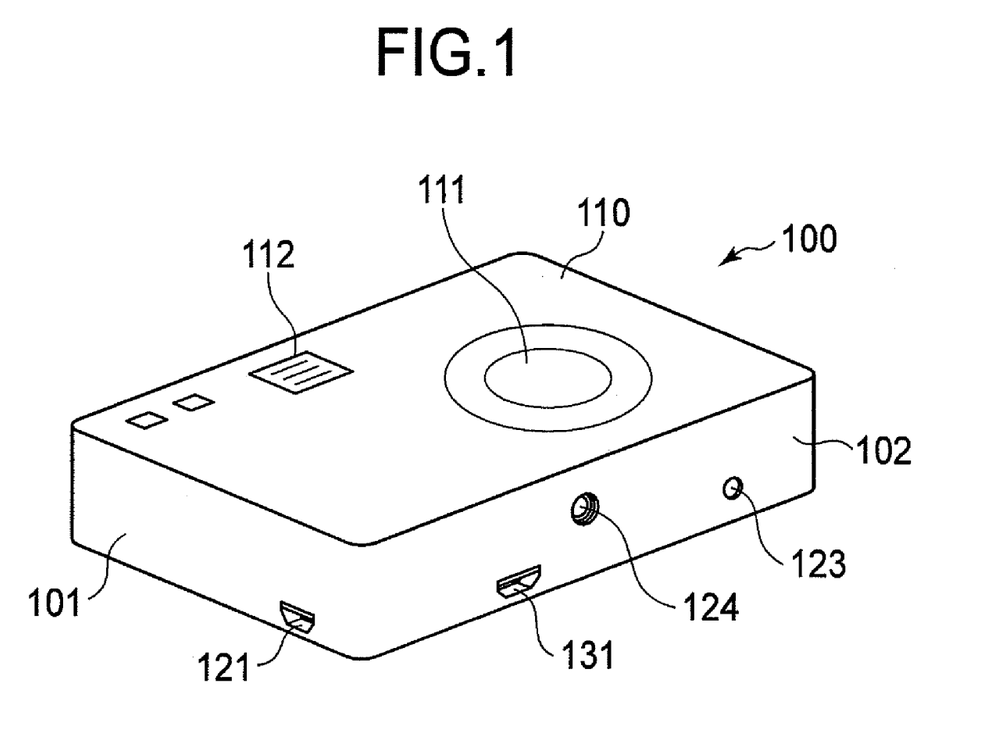
FIG. 1 is a perspective view of a camera viewed diagonally from its base side, as the first embodiment of the present invention.

FIG. 1 is a perspective view of a digital camera 100 as a portable device viewed diagonally from its base side. Lens 111 and a flash 112 are provided on the front side of the digital camera 110. A first connecting member 121 is provided on the lateral side 101. The first connecting member 121 is a receptacle for a USB connector (USB camera-side connector 121). A second connecting member 131, a detection switch 123, and tripod mount hole 124 are provided on the bottom 102 of the digital camera. The second connecting member 131 is a receptacle of a connector which is compliant with the ImageLink™ print system.

Figure 2:
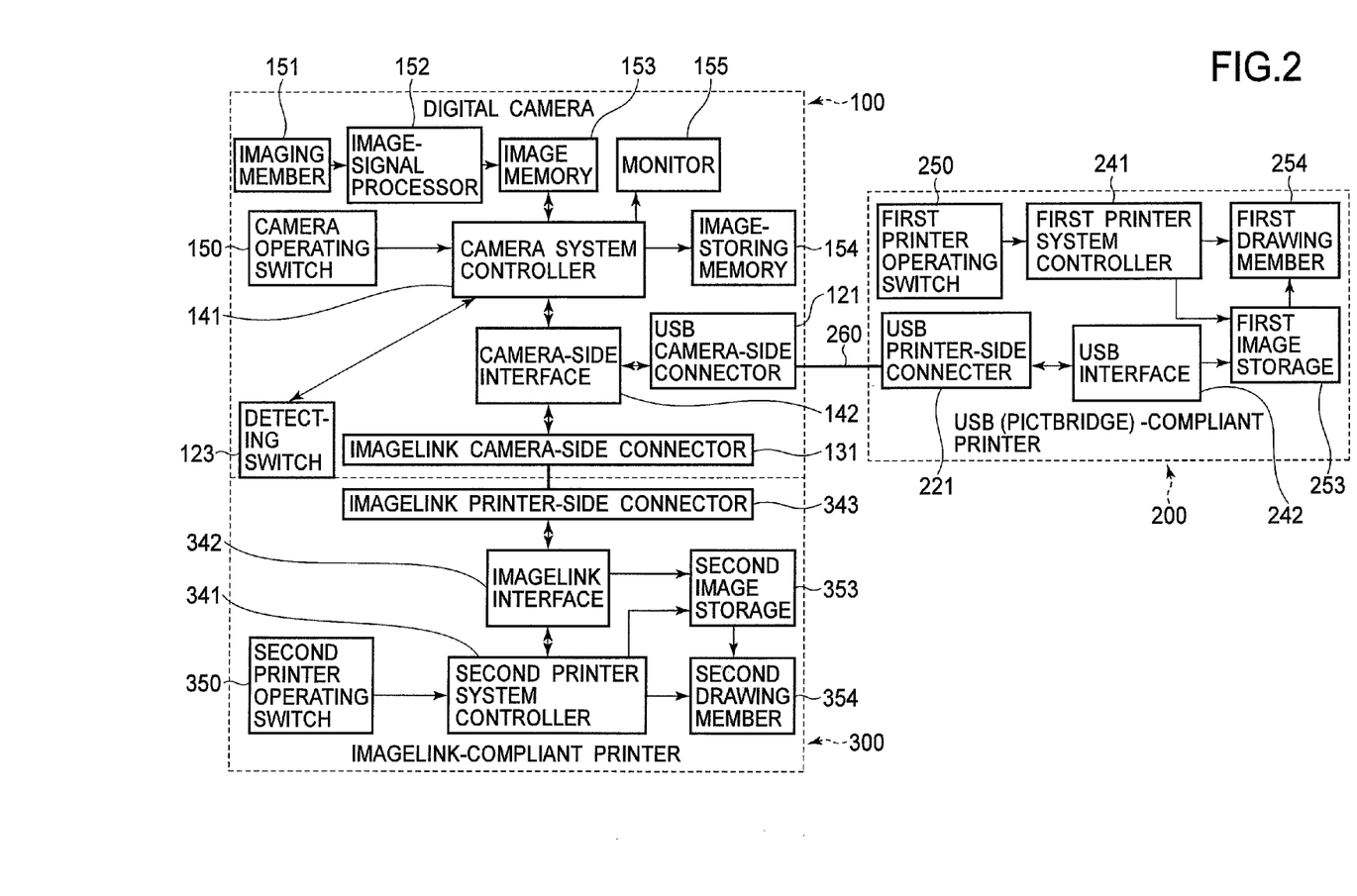
FIG. 2 is a block diagram of the digital camera and the external device.

The construction of the digital camera 100 and printer is described below with reference to FIG. 2.

The digital camera 100 is connectable to a first printer 200 with the USB camera-side connector 121, and a second printer 300 with the ImageLink™ connector 131. The first printer 200 is a USB-compliant printer 200 which may communicate with the digital camera 100 using the USB standard, and print photographed images using the PictBridge™ standard. The second printer 300 is an ImageLink™-compliant printer 300.

The digital camera 100 is controlled by a camera system controller 141. The user may send a photographing signal to the camera system controller 141 using a camera operating switch 150. The camera system controller 141 receives the photographing signal, and photographs an object with an imaging member 151. After photographing, the imaging member 151 outputs the image signal to an image-signal processor 152. The image signal possessor 152 processes the image signal and temporarily stores it in an image memory 153, and outputs an image file. The camera system controller 141 stores the image files which are output from the image-signal processor 153 to an image-storing memory 154.

A monitor 155 displays an image corresponding to the image file stored in the image-storing memory 154.

The camera system controller 141 is connected to the camera-side interface 142. The camera-side interface 142 is connected to the USB camera-side connector 121 and ImageLink™ camera-side connector 131, and controls the communications through each connector. The USB camera-side connector 121 is used for connecting the USB-compliant printer 200. The ImageLink™ camera-side connector 131 is used for connecting the ImageLink™-compliant printer 300.

The USB-compliant printer 200 is controlled by a first printer system controller 241. The first printer system controller 241 is connected to a first drawing member 254 which is used for printing images, a first image storage 253 which is used for storing image files, USB interface 242 which is used to connect the digital camera 242, and a first printer operating switch 250. The USB interface 242 is compatible with the USB specification. The USB printer-side connector 221 is a receptacle which mates with a USB connector.

When the USB camera-side connector 121 is connected to the USB printer-side connector 221, the camera-side interface 142 and the USB interface 242 perform a connecting process, so that a USB connection is established between them. Thereby, the camera system controller 141 may communicate with the first printer system controller 241.

Images which the user desires to print are selected with camera operating switch 150. The first printer system controller 241 receives the specified images from the digital camera 100 through the USB interface 242. The received images are stored in the first image storage 253, and printed by the first drawing member 254. Moreover, the user may print desired images by operating the first printer operating switch 250.

The ImageLink™-compliant printer 300 has similar construction to the USB-compliant printer 200. The ImageLink™ interface 342 is compliant with the ImageLink™ print system. The ImageLink™ printer connector 343 is a plug which mates with the ImageLink™ connector.

When the ImageLink™-compliant printer connector is inserted into the ImageLink™ camera connector 131, the camera interface 142 and the ImageLink™ interface 342 perform a connecting process, so that an ImageLink™ connection is established between them. Thereby, the second printer system controller 341 may take control the digital camera 100.

The camera system controller 141 is connected to the detection switch 123. The detection switch 123 detects that the ImageLink™-compliant printer 300 is connected to the ImageLink™ camera connector 131.

Figure 3:
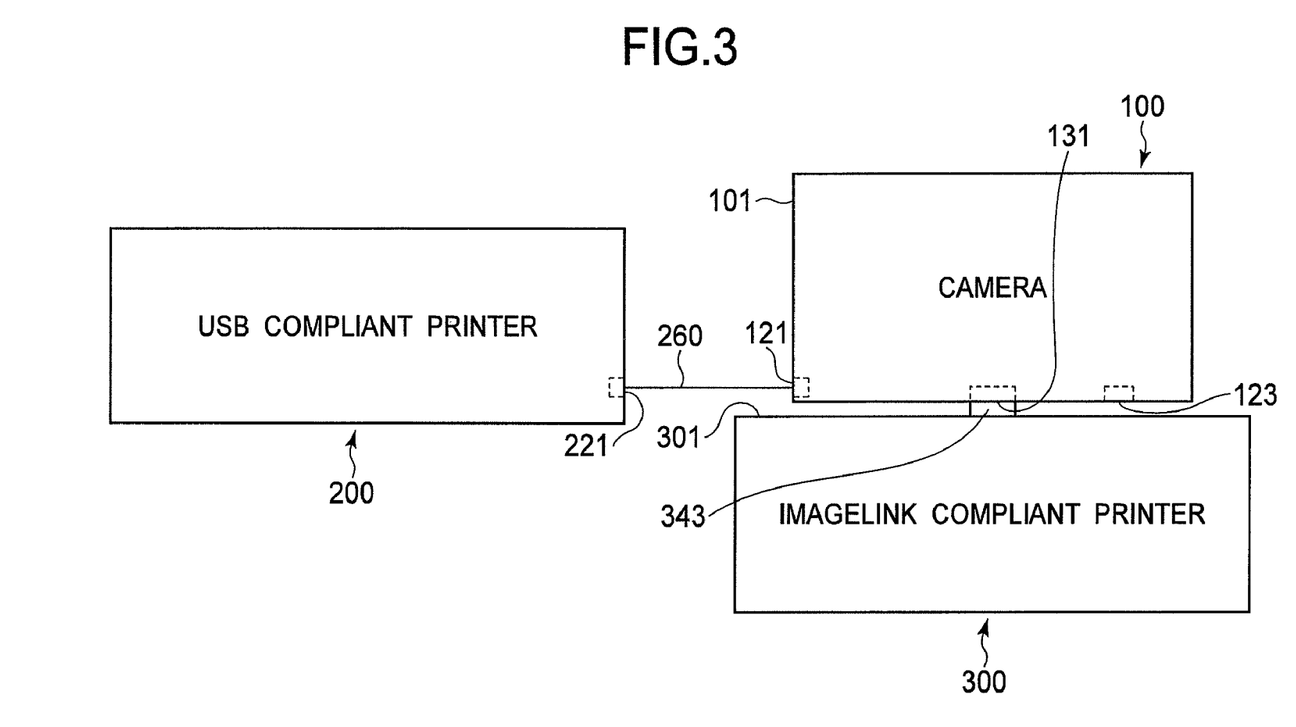
FIG. 3 is a schematic view showing the digital camera and the external device which is connected to the digital camera.

The connection between the digital camera 100 and the USB-compliant printer 200 or the ImageLink™-compliant printer 300 is described with reference to FIG. 3.

The USB-compliant printer 200 is provided with a USB printer connector 221 on its lateral side.

The ImageLink™-compliant printer 300 comprises an attaching surface 301 on the top surface on which the digital camera 100 may be placed. The ImageLink™ printer connector 343 projects perpendicularly from the attaching surface 301.

The USB camera connector 121 is connected to USB printer connector 221 by USB cable 260. The digital camera 100 is placed on the attaching surface 301 while the ImageLink™ camera connector 131 engages with the ImageLink™ printer connector 343.

At that moment, the digital camera 100 is connected to both the ImageLink™-compliant printer 300 and the USB-compliant printer 200. However, the digital camera 100 cannot communicate simultaneously with both printers because the communication specifications and the performance of the digital camera 100 do not permit communication with two printers. Therefore, the camera system controller 141 decides with which printer to communicate through the process described below.

Figure 4:
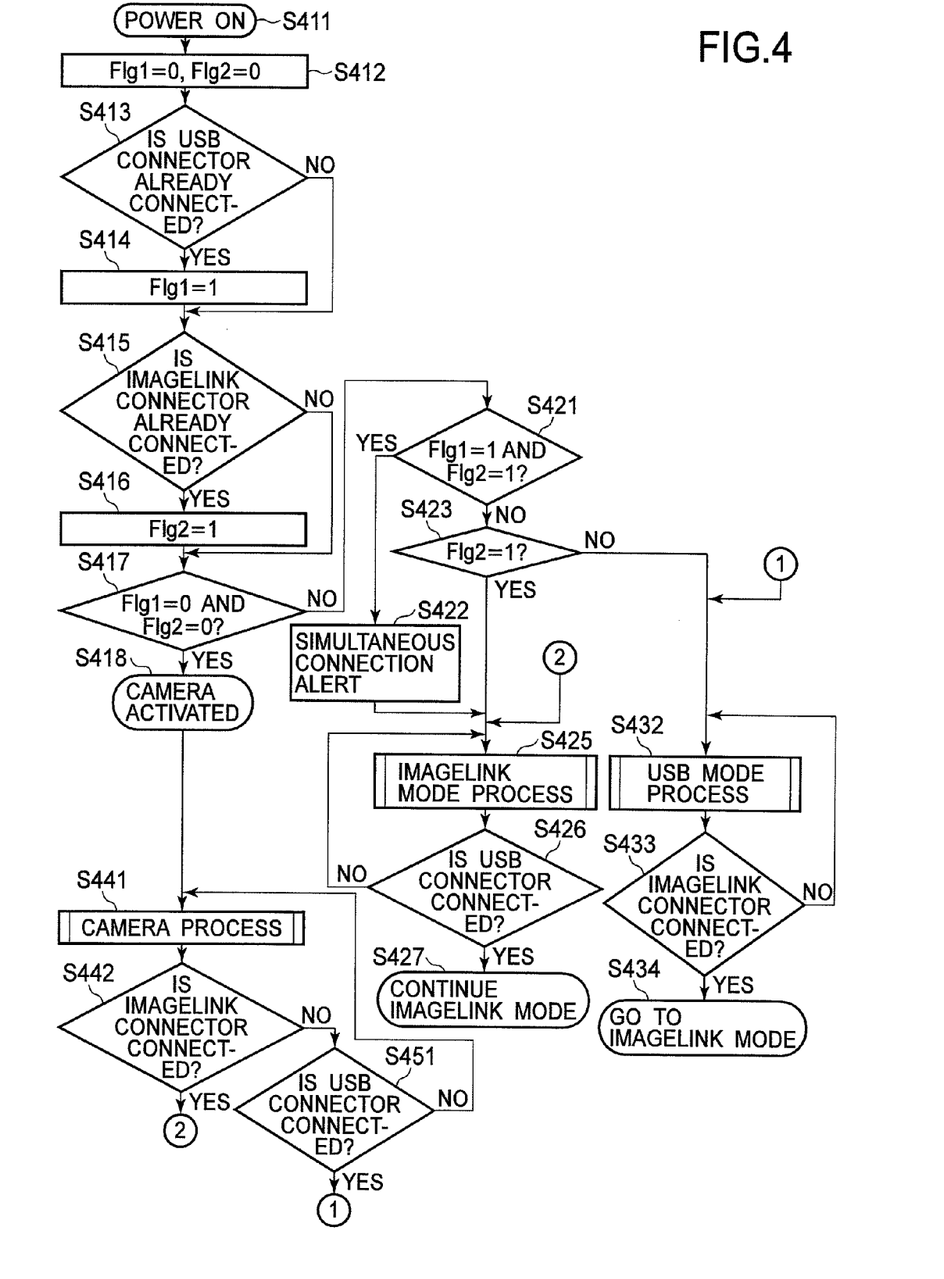
FIG. 4 is a flowchart showing the first selection process.

A first connecting process is described below with reference to FIG. 4.

In the first connecting process, the ImageLink™ connection is used in preference to the USB connection. The process that the camera system controller 141 executes when it is powered on is described with reference to steps S411 to S434.

The first connecting process starts from step S411 when the digital camera 100 is powered on.

Flags Flg1 and Flg2 are initialized in step S412. The flag Flg1 indicates whether the USB camera connector 121 is connected to the USB-compliant printer 200 or not. In the case they are connected, the flag Flg1 is set to 1, otherwise, it is set to 0. The flag Flg1 is initially set to 0. The flag Flg2 indicates whether the ImageLink™ camera connector 131 is connected to the ImageLink™-compliant printer 300 or not. In the case they are connected, the flag Flg2 is set to 1; otherwise, it is set to 0. The flag Flg2 is initially set to 0.

In step S413, the camera system controller 141 judges whether the USB camera connector 121 is connected to the USB printer connector 221. In the case they are connected, the flag Flg1 is set to 1 in step S414. Otherwise, the flag Flg1 is not set to 1, so that its value remains 0, and the process advances to step S415.

In step S415, the camera system controller 141 judges whether the ImageLink™ camera connector 131 is connected to the ImageLink™ printer connector 343. In the case they are connected, the flag Flg2 is set to 1 in step S416. Otherwise, the flag Flg2 is not set to 1, so that its value is kept to 0, and the process advances to step S417.

In step S417, it is judged whether the flags Flg1 and Flg2 are both 0 or not. This judgment enables the recognition that the USB connection and the ImageLink™ connection are established. When the flags Flg1 and Flg2 are both 0, i.e. the USB camera connector 121 is not connected to the USB-compliant printer 221 and the ImageLink™ camera connector 131 is not connected to the ImageLink™-compliant printer 343, the digital camera 100 is activated and photographing preparation is performed. When the flag Flg1 and Flg2 are not 0, i.e. the USB camera connector 121 is connected to the USB-compliant printer 221 and/or the ImageLink™ camera connector 131 is connected to the ImageLink™-compliant printer 343, the process advances to step S421.

In step S421, it is judged whether the flags Flg1 and Flg2 are 1 or not. When the flags Flg1 and Flg2 are both 1, i.e., the USB camera connector 121 is connected to the USB-compliant printer 221 and the ImageLink™ camera connector 131 is connected to the ImageLink™-compliant printer 343, the process advances to step S422. In step S422, the alert that both the USB camera connector 121 and the ImageLink™ camera connector 131 are connected is displayed on the monitor 155 or a beep is sounded. In step S421, when both flags Flg1 and Flg2 are not 1, the process advances to step S423.

In step S423, it is judged whether the flag Flg2 is 1 or not. When the flag Flg2 is 1, i.e. the ImageLink™ camera connector 131 is connected to the ImageLink™-compliant printer 343, the process advances to step S425. When the flag Flg2 is not 1, i.e., the ImageLink™ camera connector 131 is not connected to the ImageLink™-compliant printer 343, the process advances to step S432.

In step S425, the digital camera 100 is activated with ImageLink™ connection mode, and executes an ImageLink™ mode process. The ImageLink™ connection mode is an operational mode in which the digital camera 100 and the ImageLink™-compliant printer 300 are connected using the ImageLink™ specification. In the ImageLink™ connection mode, the camera interface 142 and the ImageLink™ interface 342 perform a connection process, so that an ImageLink™ connection is established between them. After that, a second printer system controller 341 controls the digital camera 100, so that data (i.e. image data) is transferred between them.

When the ImageLink™ mode process is finished, it is determined whether the USB camera connector 121 is connected to the USB printer connector 221 in step S426. In the case it is not connected, the process returns to step S425, and executes the ImageLink™ mode process again. In the case it is connected, the process advances to step S427, and continues the ImageLink™ mode process. Therefore, in the case the digital camera 100 is activated with the ImageLink™ mode, the USB connection between the USB camera connector 121 and the USB printer connector 221 is neglected, even if the USB camera connector 121 is connected to the USB printer connector 221.

Otherwise, the flag Flg2 is not 1 in step S423, and it is judged that the ImageLink™ camera connector 131 is not connected to the ImageLink™ printer connector, and the process advances to step S432.

In step S432, the digital camera is activated with the USB connection mode, and executes a USB connection mode process. The USB connection mode is an operational mode in which the digital camera 100 and the USB-compliant printer 200 are connected following the USB specification. In the USB connection mode, the camera interface 142 and the USB interface 242 perform a connection process, so that the USB connection is established between them. After that, the camera system controller 141 communicates with a first printer system controller 241 so that data (i.e., image data) may be transferred between them.

When the USB mode process is finished, it is determined whether the ImageLink™ camera connector 131 is connected to the ImageLink™ printer connector 343 in step S433. In the case it is not connected, the process returns to step S432, and executes the USB mode process. In the case it is connected, the process advances to step S434, and the digital camera 100 disconnects the connection with the USB-compliant printer 200, and switched to the ImageLink™ mode. Therefore, in the case the digital camera 100 is connected to the ImageLink™ printer connector 343 when the digital camera 100 is activated with the ImageLink™ mode, the connection with the ImageLink™-compliant printer is used in preference to the connection with the USB-compliant printer 200.

The process which is executed while the digital camera 100 is activated is described with reference to steps S442 to S451.

In step S418, the digital camera 100 is activated and photographing preparation is performed. After that, the process advances to step S441.

In step S441, a camera process is executed. The camera process includes a photographing process and a displaying process which displays image data stored in the image-storing memory 154 on the monitor 155. After the camera process is executed, it is judged whether the ImageLink™ camera connector 131 is connected to the ImageLink™ printer connector 343 in step S442. In the case it is connected, the process advances to step S425, and the digital camera 100 switches to the ImageLink™ connection mode.

In step S442, the ImageLink™ camera connector 131 is not connected to the ImageLink™ printer connector 343, and it is determined whether the USB camera connector 121 is connected to the USB printer connector 221 in the following step S451. In the case it is connected, the process advances to step S432, and the digital camera 100 advances to the USB connection mode. In the case it is not connected, the process returns to step S441, and the digital camera 100 executes the camera process.

According to this embodiment, in the case a number of the connectors provided with the digital camera 100 are connected to external devices, the digital camera 100 selects and keeps the connection with the ImageLink™-compliant printer 300, so that images may be reliably printed.

A second embodiment is described with reference to FIGS. 2, and 5-8. In this embodiment, the camera system controller 141 detects whether the ImageLink™ camera connector 131 is connected to the ImageLink™ printer connector 343 through the detection switch 123.

Figure 5:
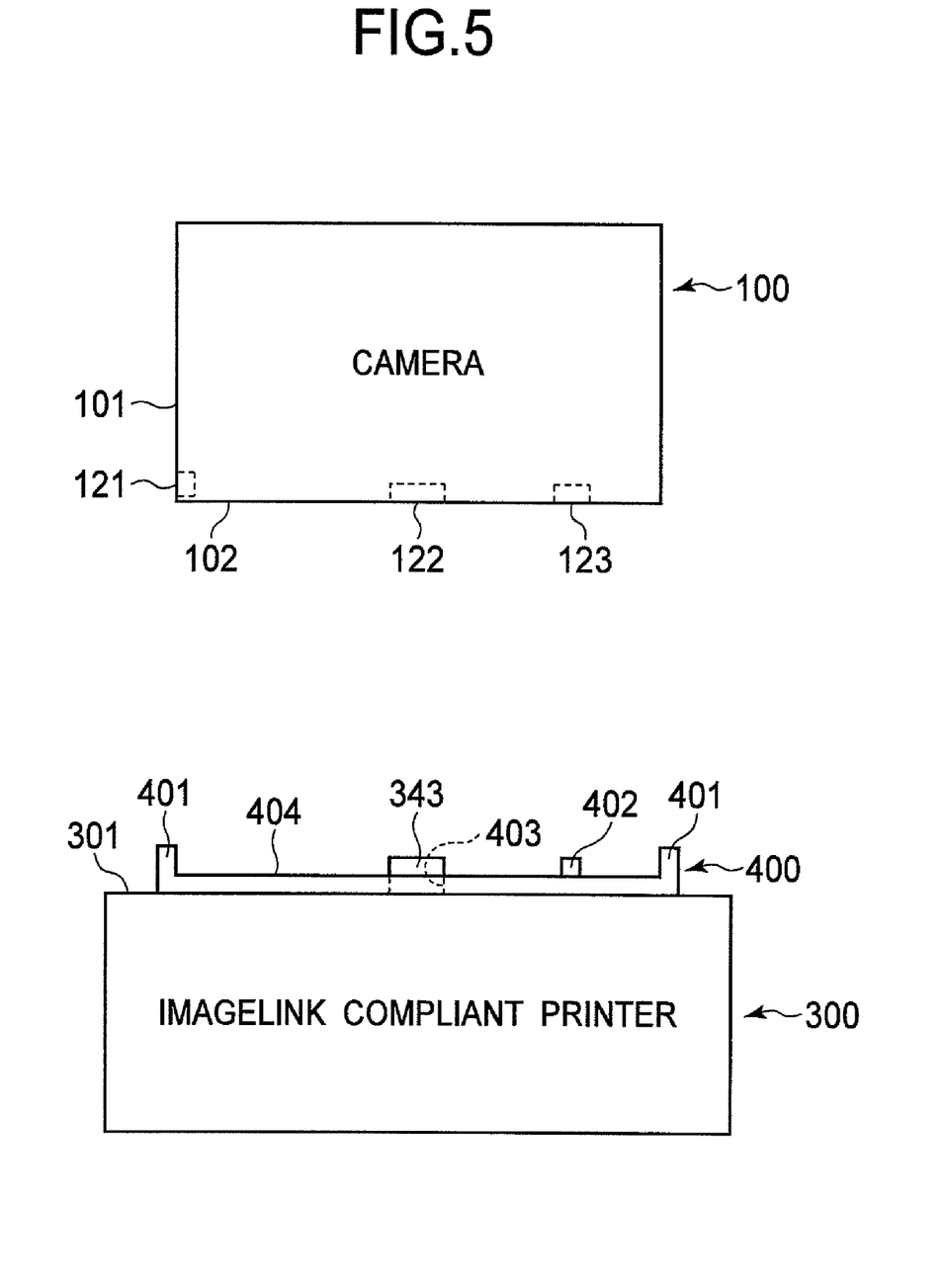
FIG. 5 is a schematic view showing the digital camera and an external device which may be connected to the digital camera with a insertion dock.
Figure 7:
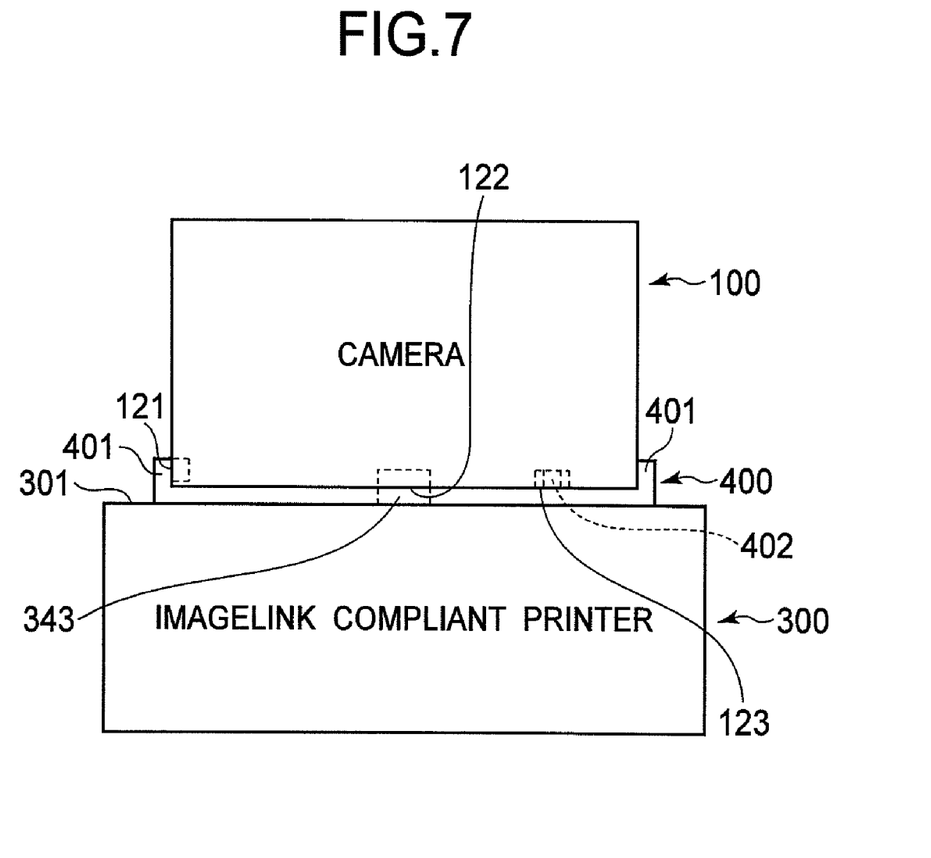
FIG. 7 is a schematic view showing the digital camera and the external device which is connected to the digital camera with a insertion dock.

Referring to FIG. 5, the insertion dock 400 is provided on the attaching surface 301 for adequately supporting the digital camera 100. The insertion dock 400 has flange 401 which extends upward from the attaching surface 301. FIG. 7 shows the digital camera connected to the ImageLink™-compliant printer 300. The flange 400 contacts parts of the front, side, and rear surfaces which are near the bottom of the digital camera 100, so that movement of the digital camera in the plane of the attaching surface 301 is restricted. Moreover, the flange 401 covers the USB camera connector 121 which is provided on the lateral side of the digital camera 100. Due to this construction, USB cable connection with connector 121 is prevented.

The insertion dock 400 comprises a hole 403 through which by the ImageLink™ printer connector 343 projects from the attaching surface 301. In the case the digital camera 100 is attached to the insertion dock 400, the ImageLink™ printer connector 343 passes through the hole 403, and engages with the ImageLink™ camera connector 131.

Figure 6:
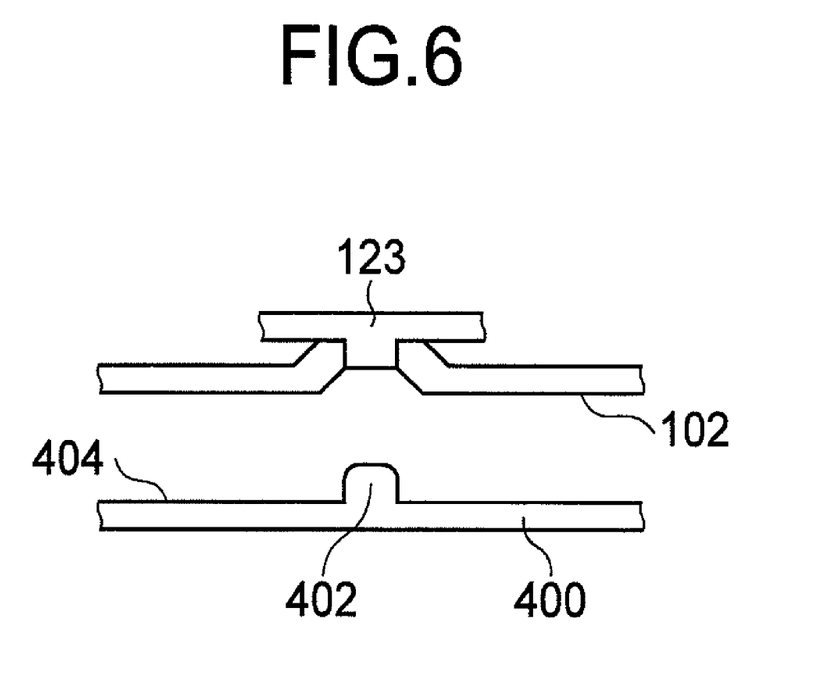
FIG. 6 is a partial cross-sectional view of a detection switch that is provided in the digital camera.

Referring to FIG. 6, the insertion dock 400 has a detection projection 402 which projects from a contact surface 404 which contacts the bottom 102 of the digital camera 100. When the digital camera is attached to the insertion dock 400, the detection projection 402 pushes the detection switch 123. The detection switch 123 sends a detection signal to the camera system controller 141. The camera system controller 141 receives the detection signal, and judges that the ImageLink™ camera connector 131 is connected to the ImageLink™ printer connector 343.

Therefore, when the digital camera 100 is placed on the insertion dock 400, the ImageLink™ camera connector 131 is connected to the ImageLink™ printer connector 343, while the USB camera connector 121 is not connected to the USB cable 260.

Figure 8:
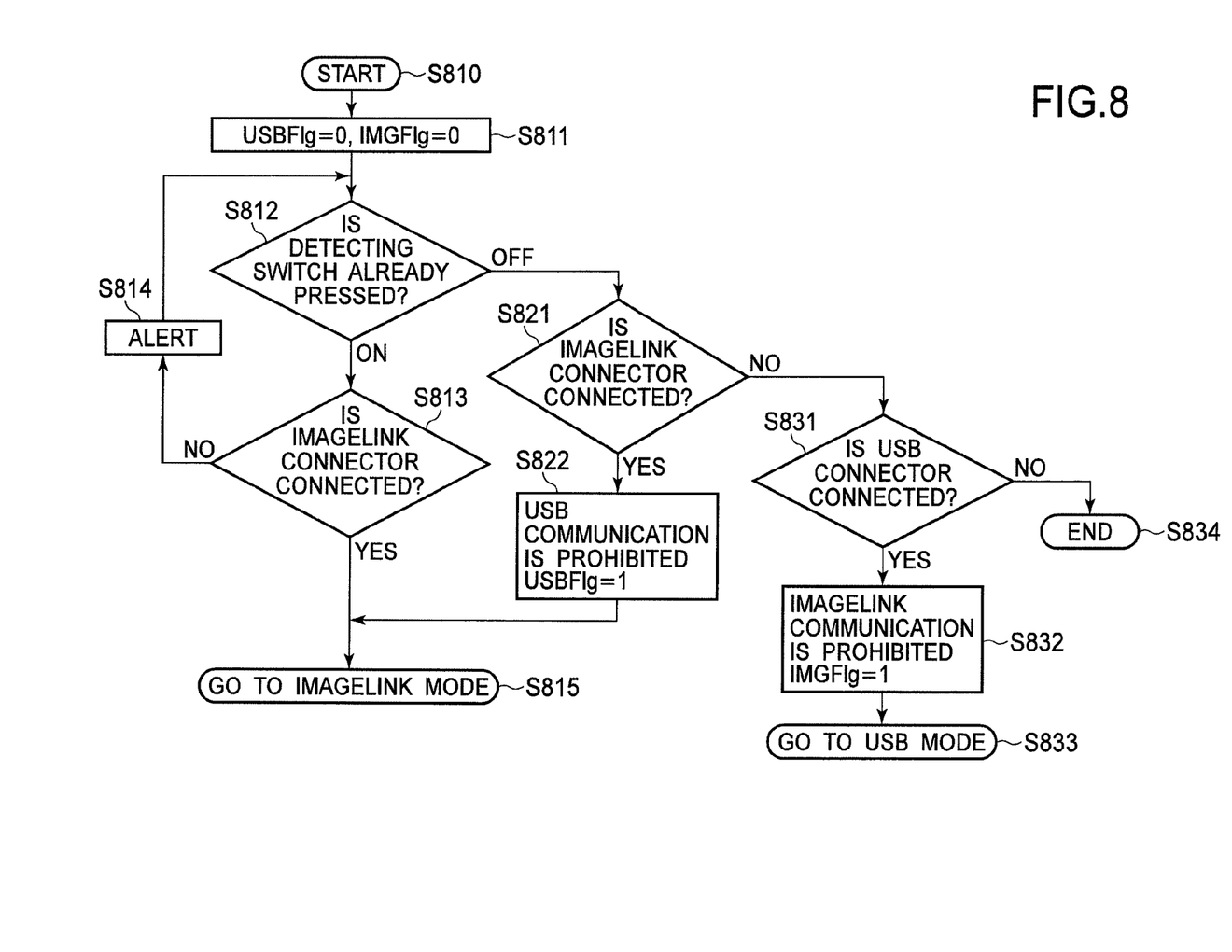
FIG. 8 is a flowchart showing the second selection process.

A second selection process is described with reference to FIG. 8.

The second selection process is such that the printer which is connected earliest is used in preference to other printers. The camera system controller 141 executes the second selection process either when the digital camera is powered on, while the digital camera is already powered on, or periodically.

The second connecting process is started from step S810. In step S811, a flag USBFlg which indicates that the USB connection is disabled, and a flag IMGFlg which indicates that the ImageLink™ connection is disabled are initialized to 0. In the case the flag USBFlg is 1, USB connection is prohibited. In the case it is 0, the USB connection is allowed. In the case the flag IMGFlg is 1, the ImageLink™ connection is prohibited. In the case it is 0, the ImageLink™ connection is allowed.

In step S812, it is judged that the detection switch 123 has been pushed by the detection projection 402, namely, the detection switch 123 has sent the detection signal. In the case the detection switch 123 has been pressed, in step S813, it is judged that the ImageLink™ camera connector 131 is connected to the ImageLink™ printer connector 343. In the case it is not connected, an alert is displayed on the monitor 155 or a beep is sounded. Then the process returns to step S812. In the case it is connected, the ImageLink™ connecting mode, i.e. the process described in step S425 in FIG. 4 is executed in step S815.

Otherwise, in the case the detection switch 123 is not pressed by the detection projection 402 in step S812, the process advances to step S821. In step S812, it is judged that the ImageLink™ camera connector 131 is connected to the ImageLink™ printer connector 343. In the case it is connected, the flag USBFlg is set to 1 in step S822, so that the USB connection is disabled. After that, the digital camera 100 moves to the ImageLink™ mode. Otherwise, the process advances to step S831.

In step S831, it is judged that the USB camera connector 121 is connected to the USB printer connector 221. In the case it is connected, the flag IMGFlg is set to 1 in step S832, so that the ImageLink™ connection is disabled. Then, the digital camera 100 moves to the USB connection mode which is shown in step S432 in FIG. 4. In the case it is not connected, the process advances to step S834, and then ends. After that, in the case that the second connecting process is executed when the power button of the digital camera 100 is pressed, the digital camera 100 is prepared for operation after the second connecting process is executed. In the case that the second connecting process is executed when the digital camera 100 is already powered on, the digital camera switches to normal operating mode.

Note that the ImageLink™ connection may be used in preference to other connections. In this case, steps S432 to S434 are performed instead of steps S832 to S833.

The printer which is connected earliest may be used in preference to other printers without judging that the detection switch 123 has been pushed by the detection projection 402. In this case, steps S812 to S814 are omitted.

According to the embodiment, in the case that the detection switch 123 detects that the ImageLink™ printer connector is connected even if multiple external devices are connected to the digital camera 100, the digital camera 100 selects and keeps the connection with the ImageLink™ compatible printer 300 so that images may be reliably printed. Moreover, in the case the ImageLink™-compliant printer is not connected, the printer which is connected earliest may be used in preference to other printers. Therefore the external device which is connected to the digital camera is selected properly, and the digital camera prints images reliably.

Note that the external devices are exemplified as printers, however, other external devices may connect with the digital camera 100. Examples of other external devices include a computer or an external memory device.

Although the embodiment of the present invention has been described herein with reference to the accompanying drawings, obviously many modifications and changes may be made by those skilled in the art without departing from the scope of the invention.

The present disclosure relates to subject matter contained in Japanese Patent Application No. 2007-211940 (filed on Aug. 15, 2007), which is expressly incorporated herein, by reference, in its entirety.

The invention claimed is:

1. A portable device that sends and receives data to and from one of a plurality of external devices and comprises:
   a plurality of connectors physically connected to the portable device that send and receive data to and from said external devices;
   an external device that is capable of activating a detecting switch;
   a detector that detects whether one of said connectors is connected to one of said external devices, said detector comprising said detecting switch that determines that said one connector is connected to one of said external devices when said detecting switch is activated by one of said external devices;
   a selector that selects one of said connectors among those connected to one of said external devices; and
   a communicator that sends and receives data to and from an external device using the selected connector;
   wherein said selector selects the one connector when the detector detects that the one connector is connected to one of said external devices.

2. The portable device according to claim 1, wherein said selector sets an order of priority among said connectors, and selects a connector which has the highest priority when said connectors are individually connected to said external devices.

3. The portable device according to claim 2, wherein said portable device is controlled by said external device which is connected to the connector which is selected by said selector.

4. The portable device according to claim 1, wherein said selector selects a connector which was connected earliest to one of said external devices.

5. The portable device according to claim 1, wherein said selector has a push switch, and detects that one of said connectors is connected to one of said external devices when said push switch is pushed.

6. The portable device according to claim 1, wherein said selector sets an order of priority among said connectors, and selects a connector which has the highest priority among said connectors which are individually connected to said external devices when said detector detects that some of said connectors have been disconnected from said external devices.

7. The portable device according to claim 1, wherein said selector selects a connector which was connected earliest to one of said external devices when said detector detects that some of said connectors have been disconnected from said external devices.

8. A printing system comprising said portable device according to claim 1 and an external device which is a printer.

9. A portable device connecting system comprising said portable device according to claim 1 and an external device wherein said detecting switch is provided on an outer surface of said portable device, one of said external devices have a projection which projects from a surface of said external device, and said detecting switch detects that said one connector is connected to said external device having a projection when said detecting switch is pushed by said projection.

* * * * *